United States Patent
D'Accolti et al.

(10) Patent No.: US 12,540,064 B2
(45) Date of Patent: Feb. 3, 2026

(54) SYSTEMS AND METHODS FOR GENERATING COVERAGE FIELDS FOR OBSTACLE DETECTION

(71) Applicant: The Raymond Corporation, Greene, NY (US)

(72) Inventors: Anthony V. D'Accolti, Manlius, NY (US); Joel N. Sunny, Mineola, NY (US); Robert P. McLachlan, Walton, NY (US)

(73) Assignee: The Raymond Corporation, Greene, NY (US)

( * ) Notice: Subject to any disclaimer, the term of this patent is extended or adjusted under 35 U.S.C. 154(b) by 163 days.

(21) Appl. No.: 18/590,432

(22) Filed: Feb. 28, 2024

(65) Prior Publication Data

US 2024/0294367 A1    Sep. 5, 2024

Related U.S. Application Data

(60) Provisional application No. 63/449,133, filed on Mar. 1, 2023.

(51) Int. Cl.
| | |
|---|---|
| *G05D 1/24* | (2024.01) |
| *B66F 9/06* | (2006.01) |
| *B66F 9/075* | (2006.01) |
| *G05D 1/617* | (2024.01) |
| *G05D 105/20* | (2024.01) |
| *G05D 107/70* | (2024.01) |
| *G05D 111/10* | (2024.01) |

(52) U.S. Cl.
CPC ............ *B66F 9/0755* (2013.01); *B66F 9/063* (2013.01); *G05D 1/24* (2024.01); *G05D 1/617* (2024.01); *G05D 2105/20* (2024.01); *G05D 2107/70* (2024.01); *G05D 2111/10* (2024.01)

(58) Field of Classification Search
CPC ......... B66F 9/0755; B66F 9/063; G05D 1/24; G05D 1/617; G05D 2107/70; G05D 2105/20; G05D 2111/10
See application file for complete search history.

(56) References Cited

U.S. PATENT DOCUMENTS

| | | | |
|---|---|---|---|
| 11,641,121 B2 | 5/2023 | Luthman et al. | |
| 11,661,324 B2 | 5/2023 | Pöschl et al. | |
| 2021/0327300 A1 | 10/2021 | Weiss et al. | |
| 2021/0375080 A1 | 12/2021 | Kumar et al. | |
| 2022/0253071 A1 | 8/2022 | Thode | |
| 2023/0137089 A1 | 5/2023 | Tretyakov | |

FOREIGN PATENT DOCUMENTS

| | | |
|---|---|---|
| CN | 114930263 A | 8/2022 |
| EP | 4194989 A1 | 6/2023 |

OTHER PUBLICATIONS

European Patent Office, Extended European Search Report, Application No. 24160786.0, May 28, 2024, 14 pages.

*Primary Examiner* — Mathew Franklin Gordon
(74) *Attorney, Agent, or Firm* — Quarles & Brady LLP

(57) ABSTRACT

Systems and methods for generating a coverage field for obstacle detection. The system includes a sensor to detect obstacles. The system further includes a material handling vehicle guided by a guidance system and a controller. The controller is configured to: generate a coverage field for the sensor, receive position characteristics of the material handling vehicle, determine a position of the material handling vehicle relative to the guidance system based on the position characteristics, and transform the coverage field based on the determined position of the material handling vehicle.

20 Claims, 6 Drawing Sheets

SYSTEMS AND METHODS FOR GENERATING COVERAGE FIELDS FOR OBSTACLE DETECTION

CROSS-REFERENCE TO RELATED APPLICATION

This application claims the benefit of and priority to U.S. Provisional Application No. 63/449,133, filed on Mar. 1, 2023, the entire contents of which are herein incorporated by reference for all purposes.

BACKGROUND

Material handling vehicles (MHVs) have been developed to transport goods loaded onto generally standardized transport platforms. For example, MHV are often used to lift goods loaded onto a pallet. In some instances, the MHV may be a wire guided vehicle and maneuvering through a very narrow aisle (VNA) in a warehouse environment.

BRIEF SUMMARY

In some examples, MHVs may be operator controlled, or may be able to navigate autonomously and detect obstacles in its path, and the MHV can adjust movement parameters based on obstacles detected within its path. A MHV may do such with the implementation of autonomous navigation sensors coupled to or proximate the MHV. Many autonomous navigation sensors implement image processing, wireless communication, and/or obstacle detection to accurately navigate autonomously.

The present disclosure relates generally to systems and methods for generating coverage fields for obstacle detection. More specifically, the present disclosure relates to systems and methods for assisting in generation of coverage fields for obstacle detection of a MHV maneuvering relative to or within an aisle, such as a VNA. This can occur when a MHV is attempting to enter, maneuver within, and/or exit a VNA, for example. A MHV, for example, may be guided down the VNA via a facility-based guidance system such as a wire guidance system, a rail guidance system, or the like, and/or an in-vehicle guidance system using, for example, lasers, cameras, radio waves, magnets, or the like.

In some aspects, the present disclosure provides a system comprising a sensor, a material handling vehicle guided by a guidance system, and a controller. The controller is configured to: generate a coverage field, receive position characteristics of the material handling vehicle, determine a position of the material handling vehicle relative to the guidance system based on the position characteristics, and transform the coverage field based on the determined position of the material handling vehicle.

In another aspect, the present disclosure provides a method for generating a coverage field for obstacle detection. The method comprises generating, via a controller, a coverage field for a sensor output, receiving, via the controller, position characteristics of a material handling vehicle guided by a guidance system; determining, via the controller, a position of the material handling vehicle relative to the guidance system; and transforming the coverage field based on the determined position of the material handling vehicle.

In another aspect, the present disclosure provides a method for generating a coverage field for obstacle detection. The method comprises generating, via a controller, a coverage field for a sensor, receiving, via the controller, position characteristics of a material handling vehicle operating in an aisle and guided by a guidance system; determining, via the controller, a position of the material handling vehicle relative to the aisle; and transforming the coverage field based on the determined position of the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
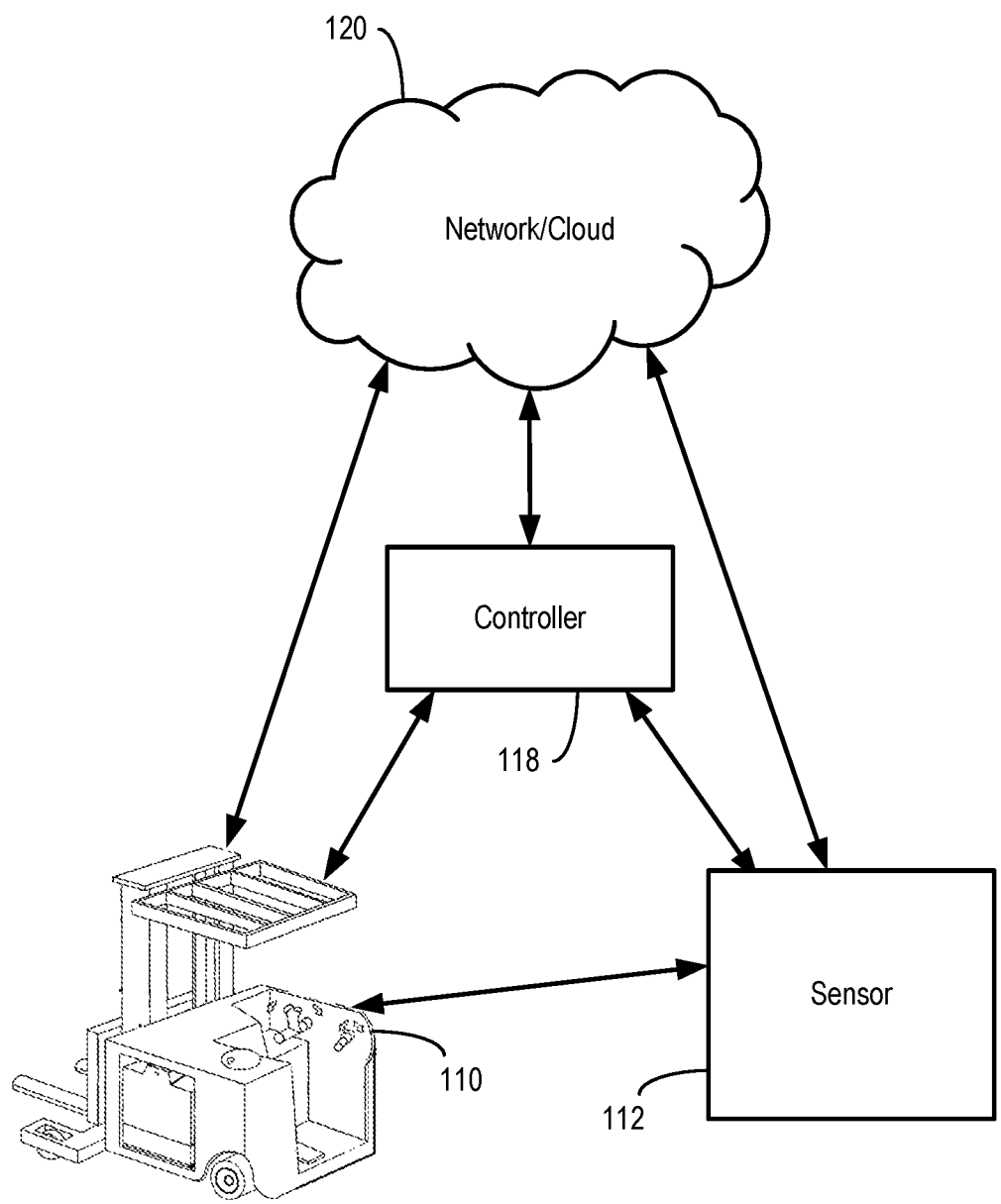
FIG. 1 is a block diagram of an example system architecture including an example MHV, a controller, and a sensor, according to some aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative to a reference frame of a particular example of illustration.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

The present disclosure may be implemented on or with the use of computing devices including control units, processors, and/or memory elements in some examples. As used herein, a "control unit" may be any computing device configured to send and/or receive information (e.g., including instructions) to/from various systems and/or devices. A control unit may comprise processing circuitry configured to execute operating routine(s) stored in a memory. The control unit may comprise, for example, a processor, microcontroller, application-specific integrated circuit (ASIC), field-programmable gate array (FPGA), and the like, any other digital and/or analog components, as well as combinations of the foregoing, and may further comprise inputs and outputs for processing control instructions, control signals, drive signals, power signals, sensor signals, and the like. All such computing devices and environments are intended to fall within the meaning of the term "controller," "control unit," "processor," or "processing circuitry" as used herein unless a different meaning is explicitly provided or otherwise clear from the context. The term "control unit" is not limited to a single device with a single processor, but may encompass multiple devices (e.g., computers) linked in a system, devices with multiple processors, special purpose devices, devices with various peripherals and input and output devices, software acting as a computer or server, and combinations of the above. In some implementations, the control unit may be configured to implement cloud processing, for example by invoking a remote processor.

Moreover, as used herein, the term "processor" may include one or more individual electronic processors, each of which may include one or more processing cores, and/or one or more programmable hardware elements. The processor may be or include any type of electronic processing device, including but not limited to central processing units (CPUs), graphics processing units (GPUs), ASICs, FPGAs, microcontrollers, digital signal processors (DSPs), or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations described herein may be performed by any one or more of the microprocessors or processing cores, in series or parallel, in any combination.

As used herein, the term "memory" may be any storage medium, including a non-volatile medium, e.g., a magnetic media or hard disk, optical storage, or flash memory; a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc.; on-chip memory; and/or an installation medium where appropriate, such as software media, e.g., a CD-ROM, or floppy disks, on which programs may be stored and/or data communications may be buffered. The term "memory" may also include other types of memory or combinations thereof. For the avoidance of doubt, cloud storage is contemplated in the definition of memory.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope in accordance with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles (MHVs) are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles.

FIG. 1 illustrates a block diagram of an example system architecture including an example material handling vehicle (MHV) 110 and a sensor 112, according to some aspects of the present disclosure. In addition, the system architecture of FIG. 1 may include a controller 118. The controller 118 may be a control unit as described above and may include one or more processors and one or more memories. In some examples, the controller 118 may communicate with one or more material handling vehicles (MHVs), such as MHV 110. In addition, or alternatively, the controller 118 may be configured to communicate or otherwise interface with the sensor 112. In an example, the controller 118 may execute instructions stored in memory that cause the controller 118 to initiate a coverage field generation routine, for example, configured to generate, and in some instances to alter the coverage field for detection of obstacles within the field of view of the sensor 112 upon execution.

Whether integrated with, or separate from another computing device (e.g., the sensor 112), the controller 118 corresponds to a processing circuitry that may be configured to execute operating routine(s) stored in a memory. The controller 118 includes any combination of software and/or processing circuitry suitable for processing data received by the sensor 112 described herein including without limitation processors, microcontrollers, application-specific integrated circuits, programmable gate arrays, and any other digital and/or analog components, as well as combinations of the foregoing, along with inputs and outputs for processing signals, and so forth. As noted above, all such computing devices and environments are intended to fall within the meaning of the term "controller" or "processing circuitry" as used herein unless a different meaning is explicitly provided or otherwise clear from the context.

In some examples, the controller 118 may communicate with the sensor 112 and/or the MHV 110 over a communication network 120, such as a cloud network, a local area network (LAN), a personal area network (PAN), or another a computing network including at least two computing devices in wired and/or wireless communication with one another. In such examples, the controller 118 may control one or more operations of the MHV 110, or the sensor 112, for example, such as by causing an adjustment of the coverage field 310 of the sensor 112 to perform obstacle detection within an aisle of a warehouse, such as the VNA 300 (see FIG. 3).

In some examples, the controller 118 may be coupled to the sensor 112. In some examples, the controller 118 may be arranged within the sensor 112. In another example, the controller 118 may be arranged externally from the sensor 112, such as by being arranged separate from the sensor 112 (e.g., within the MHV 110, etc.). In an example, the sensor 112 may be configured to sense obstacles within a VNA and transmit a signal representing a detected obstacle to the controller 118. The sensor 112 may, for example, be an image sensor, a LiDAR sensor, a RADAR sensor, or the like.

Moreover, in some examples, the controller 118 and/or the sensor 112 may be coupled to the MHV 110. In some examples, the controller 118 and/or the sensor 112 may be arranged within the MHV 110. In another example, the controller 118 and/or the sensor 112 may be arranged externally from the MHV 110, such as by being arranged separate from the MHV 110 (e.g., mounted on a wall, mounted on a ceiling, mounted on the VNA, mounted on one or more separate devices, etc.).

In some examples, the system may include one or more additional sensors configured to detect a distance of the MHV 110 relative to one or more permanent fixtures in and/or around the VNA. For example, a sensor may be mounted to the MHV 110 and configured to detect a distance to a rack face bar of the VNA. In other examples, the additional sensing capability may be a feature of the sensor 112 itself, such that the sensor 112 is configured to detect the distance of the MHV 110 relative to the one or more permanent fixtures in and/or around the VNA (e.g., if the sensor 112 is a 3D sensing device).

Figure 2:
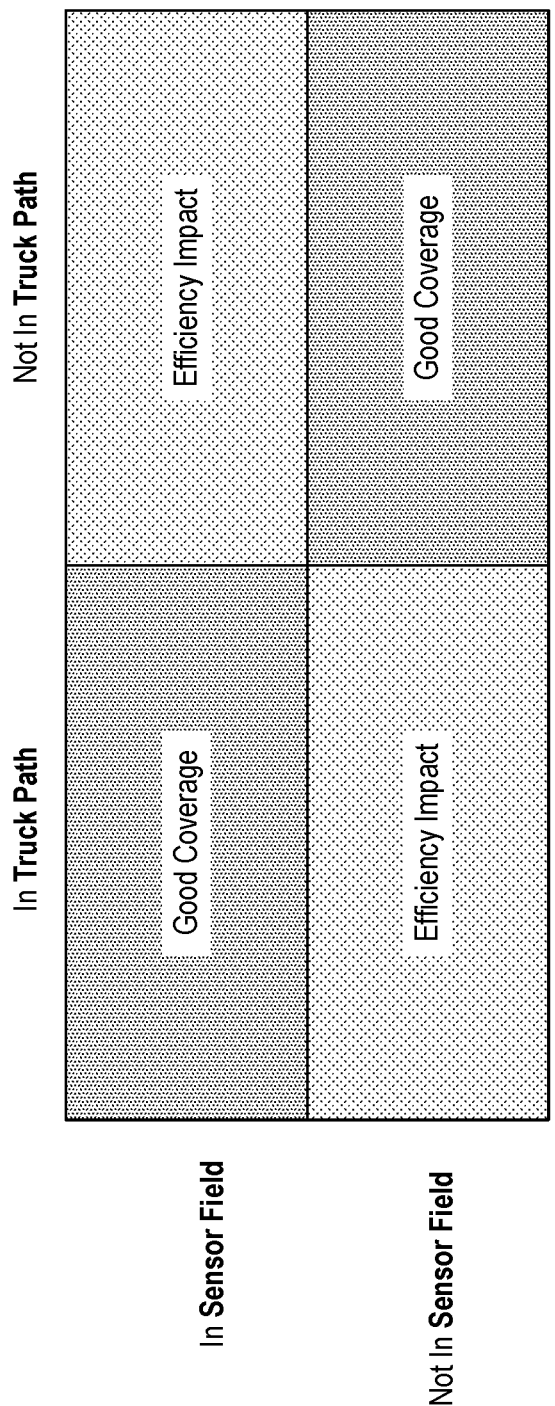
FIG. 2 is a diagram of example sensor coverage field types for obstacle detection, according to some aspects of the present disclosure.

With reference now to FIG. 2, a diagram is shown of example sensor coverage field types for obstacle detection, according to some aspects of the present disclosure. Generating coverage fields for obstacle detection applications for MHVs using wire guidance, for example, have a number of design considerations which, in some instances, can affect a desired coverage. A sensor coverage field for the MHV 110 can be in the forks first, tractor first, or both directions. Additionally or alternatively, the sensor coverage field for the MHV 110 can be oblique to the forks first or tractor first directions, including perpendicular to the forks first or tractor first directions. The desired coverage for obstacle detection for a MHV navigating a warehouse aisle or VNA can cover all regions of space within the MHV's path of travel, while not considering all regions of space not within the MHV's travel path.

The first example sensor coverage field type depicted in FIG. 2 is where an obstacle is located in the path of the MHV 110, and in the field of the sensor 112. This example provides good coverage to detect obstacles within the path of the MHV 110.

The second example sensor coverage field type depicted in FIG. 2 is where an obstacle is not in the sensor field, however the obstacle is in the path of the MHV 110. This example demonstrates a coverage impact in which an obstacle may not be being sensed by the sensor 112.

The third example sensor coverage field type depicted in FIG. 2 is where an obstacle is sensed in the sensor field, however the obstacle is not located in the path of the MHV 110. This example represents an efficiency impact in which obstacles that may not affect the travel of the MHV 110 are being detected.

The fourth example sensor coverage field type depicted in FIG. 2 is where an obstacle is not in the field of the sensor 112 and is not in the path of the MHV 110. This example demonstrates good coverage in that detection of obstacles that will not interfere with maneuvering of the MVH 110 are not detected.

Figure 3:
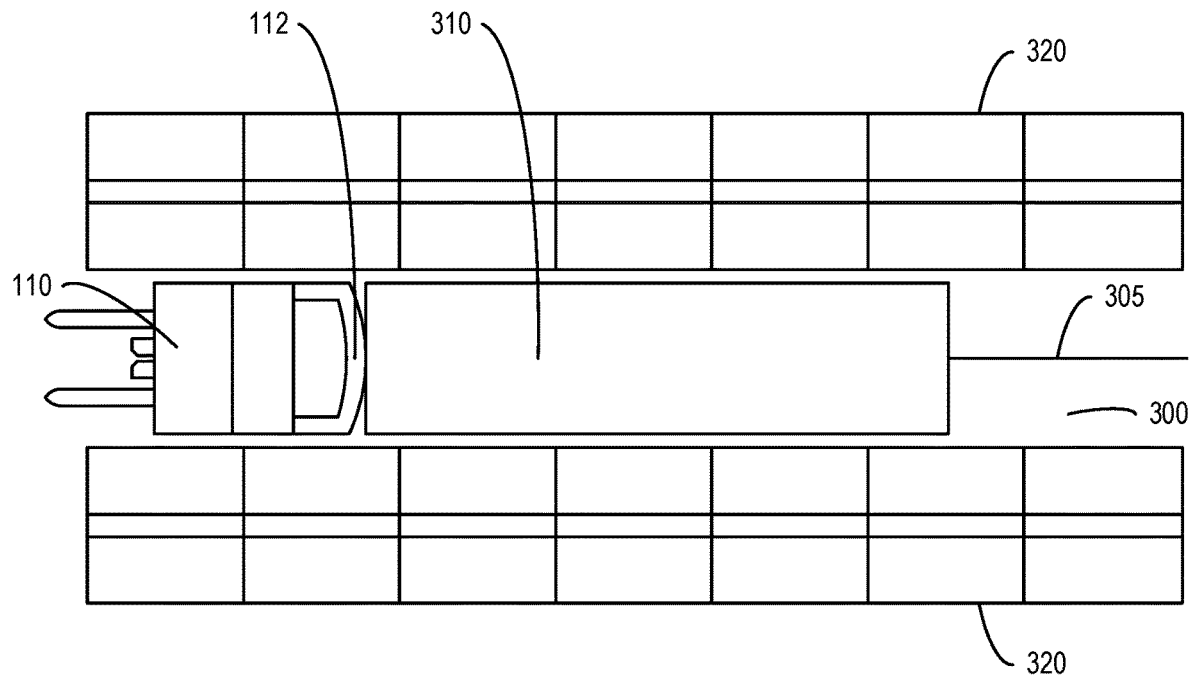
FIG. 3 is a diagram of an example MHV navigating an aisle of a warehouse with a preferred sensor coverage field, according to some aspects of the present disclosure.

FIG. 3 is a diagram of an example MHV 110 navigating a VNA 300 with a preferred heading, according to some aspects of the present disclosure. The MHV 110 can be guided through the VNA 300 via a wire 305. A wire guidance solution includes the MHV 110 traveling centered on the wire 305 and parallel to surrounding racking 320 defining the VNA 300. In some implementations, a wire guided MHV in a VNA has minimal horizontal clearance on either side of the MHV during normal operation (e.g., four inches, although the clearance can be more or less than four inches). In the example of FIG. 3, the heading of the MHV 110 provides a coverage field 310 for the sensor 112, thus detecting obstacles within the path of the MHV 110 while not considering extraneous obstacles. In some embodiments, providing a coverage field 310 for the sensor 112 may comprise the controller 118 applying the coverage field 310 to the sensor 112 output.

Figure 4:
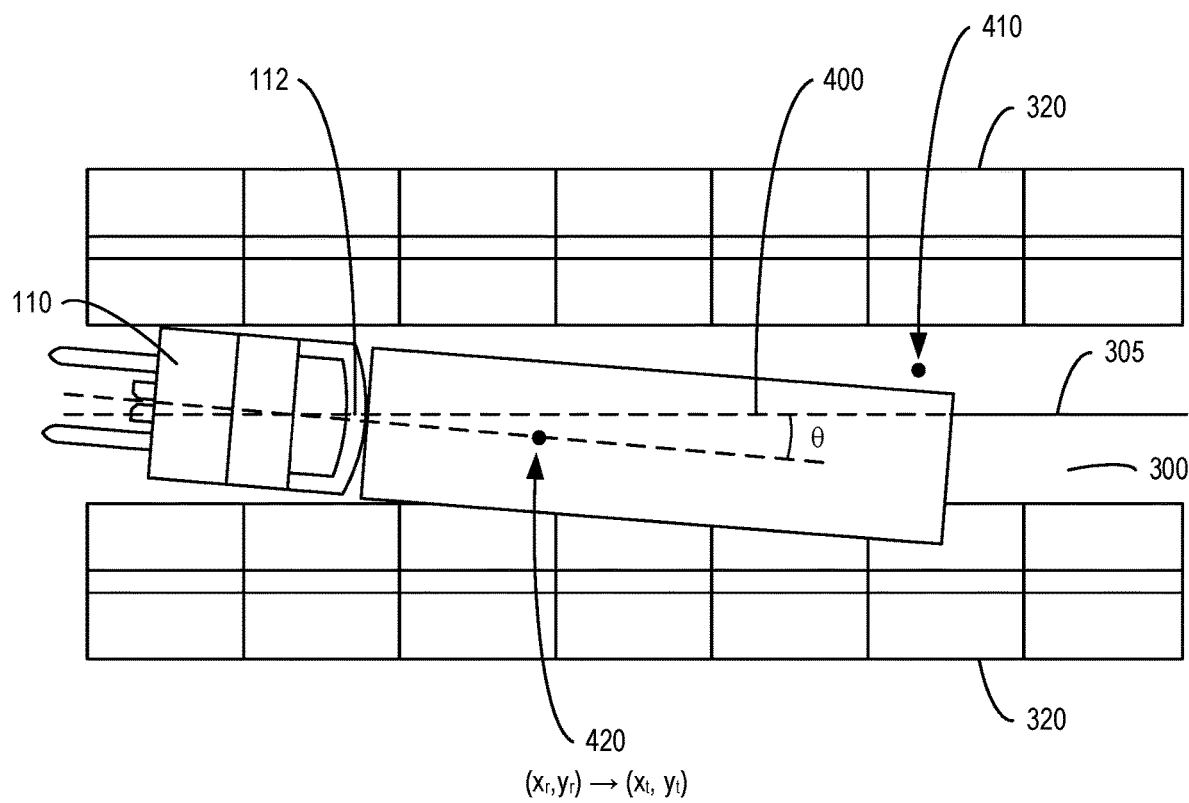
FIG. 4 is a diagram of an example MHV navigating an aisle with an actual heading and associated sensor coverage field, according to some aspects of the present disclosure.

FIG. 4 is a diagram of an example MHV navigating a VNA 300, according to some aspects of the present disclosure. The diagram illustrates the MHV 110 navigating the VNA 300 guided by the wire 305. In practice, a wire guided MHV may include deviations from the intended path, including a non-zero horizontal distance from the wire and/or a non-zero heading angle relative to the wire. As non-limiting examples, the distance from the wire may vary by plus or minus three inches, and the heading angle may vary by plus or minus three degrees. Accordingly, the MHV 110 navigating a VNA 300 with such a heading can have reduced coverage and reduced efficiency such that the coverage field 400 of the sensor 112 may not detect obstacles within the path of the MHV 110 (e.g., a point 410 in the intended path of the MHV 110), and the sensor 112 may detect obstacles that are not in the path of the MHV 110 (e.g., the racking 320 not in the intended path of the MHV 110).

Figure 5:
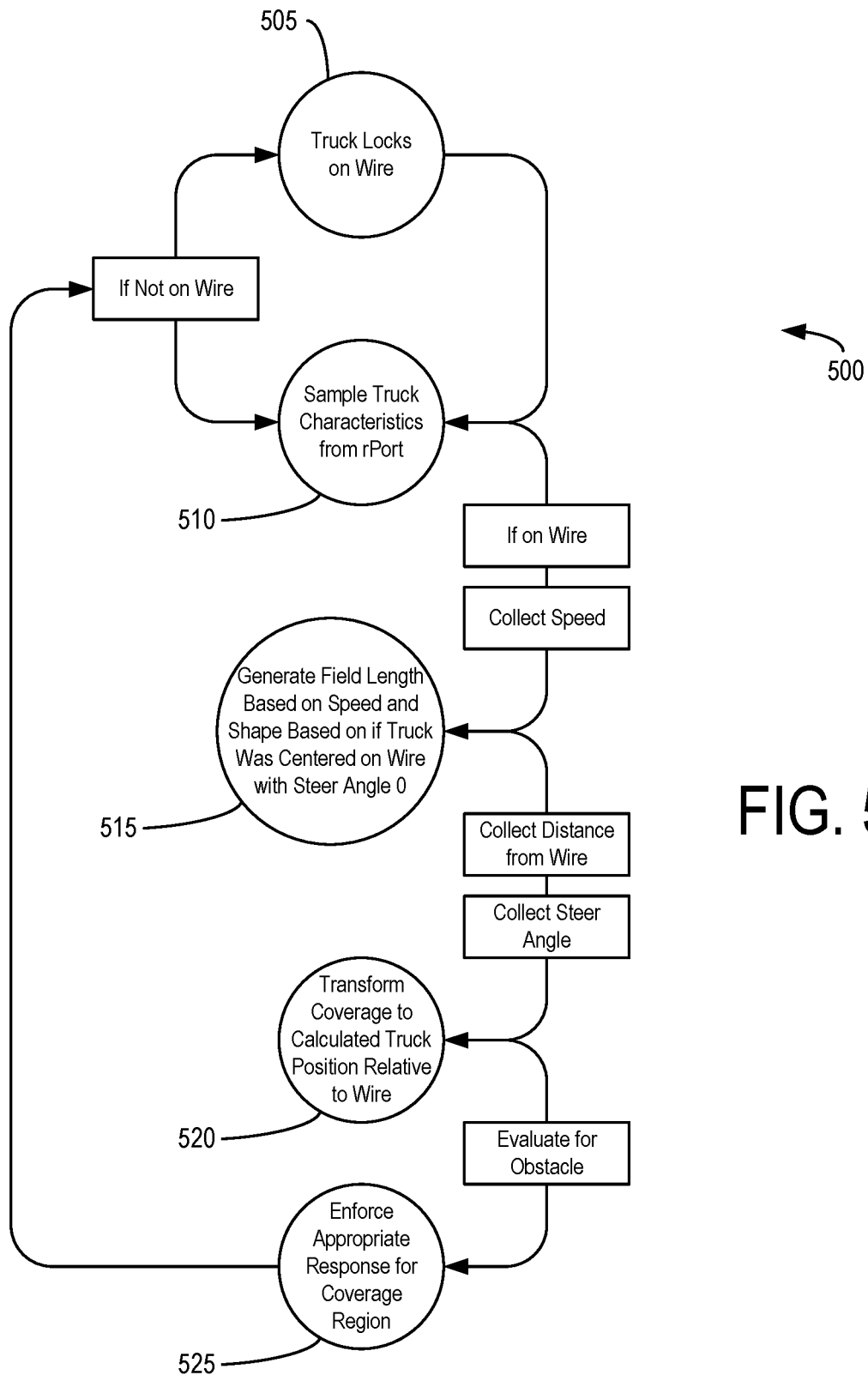
FIG. 5 is a flowchart illustrating an example process for generating a coverage field, according to some aspects of the present disclosure.

FIG. 5 is a flowchart illustrating an example process 500 for generating a coverage field, according to some aspects of the present disclosure. At block 505, the controller 118 can determine if the MHV 110 is locked on the wire 305.

At block 510, the controller 118 can receive characteristics of the MHV 110. In some embodiments, the controller 118 may receive an indication that the MVH 110 is on the wire 305. In some embodiments, the controller 118 may receive a speed of the MHV 110, a distance from the wire 305 of the MHV 110, and a steering angle of the MHV 110.

At block 515, the controller 118 can generate a coverage field, for example having a length based on the speed of the MHV 110 and a shape that assumes the truck is centered on the wire 305 with a steer angle of zero. In-aisle detection may be sensitive to variations in measurement due to how narrow the VNA 300 is, as well as how far ahead a point (e.g., points 410, 420) can be determined as an obstruction. In some embodiments, the length and shape of the coverage field may be configurable. In some embodiments, if a VNA 300 were known to have a certain width (e.g., 62 inches) with the leftmost part of the VNA 300 defined as 0 inches and the rightmost part of the VNA 300 defined as the max (e.g., 62 inches), the coverage field may comprise the entire horizontal region (e.g., 0-62 inches) or any subset(s) thereof. For example, to account for pallets extending into the VNA 300, a margin on either side of the VNA 300 may be ignored for obstruction detection. In one example, it may be predetermined that the first inch from either side of the VNA 300 will be ignored (from 0-1 inches on the left side and 61-62 inches on the right side of VNA 300). In another example, it may be predetermined to detect obstructions only in a zone at either side of the VNA 300, e.g., in the range of 0-16 inches and from 46-62 inches. Advantageously, the coverage field shape and length may be configurable, whether predetermined (e.g., horizontal regions to detect) and/or in real time (e.g., length based on speed).

The controller 118 may then determine a position of the MHV 110 relative to the wire 305. In some embodiments, the controller 118 may additionally or alternatively determine a position of the MHV 110 relative to the VNA 300 or other region the MHV 110 is operating within, for example in the case that the MHV 110 includes an in-vehicle guidance system such as LiDAR, RADAR, or the like. In some embodiments, the controller 118 may determine the position of the MHV 110 relative to the wire 305 based on a parameter, wherein the parameter is one or more of a speed of the MHV 110, a distance of the MHV 110 from the wire 305, and steering angle of the MHV 110. The speed of the MHV 110 may be determined, for example based on feedback from a speed sensor. The distance of the MHV 110 from the wire may be determined, for example, from a sensor (e.g., the sensor 112) mounted on the MHV 110 and referencing off of permanent fixtures such as the rack face bars, or information from the wire guidance system itself. The steering angle of the MHV 110 may be determined, for example, based on a steer angle sensor.

At block 520, the controller 118 can transform the coverage field of the sensor 112 for the calculated position of the MHV 110 determined at block 515. For example, block 520 may be performed in response to determining that the parameter exceeds a predetermined threshold. The predetermined threshold may include or account for a constant offset. The controller 118 may apply the transformed coverage field to the sensor output to identify or otherwise limit (e.g., as a mask) the portions of the sensor output to be used for e.g., evaluating for obstacles. In some embodiments, transforming the coverage field 520 may comprise transforming the sensor output from coordinates relative to the sensor to coordinates relative to the aisle, based on the offset and angle of the MHV 110. In some examples, at block 515, the controller 118 can determine that the MHV 110 is centered on the wire 305 and has a steering angle of zero degrees. When the MHV 110 is centered on the wire 305 and has a steering angle of zero degrees, the MHV 110 has a preferred heading and, at block 520, the coverage field of the sensor 112 may not need to be transformed to have the preferred coverage field 310 depicted in FIG. 3. In other examples, at block 515, the controller 118 can determine that the MHV 110 is not centered on the wire 305 and/or has a non-zero steering angle. When the MHV 110 is not centered on the wire 305 and/or has a non-zero steering angle, at block 520, the coverage field of the sensor 112 can be transformed to adjust the coverage field 600 within the VNA 300. An example of a transformed sensor coverage field to accommodate obstacle detection is described below with respect to FIG. 6. The controller 118 may use the transformed coverage field in connection with data output from the sensor 112 to evaluate for obstacles and initiate an appropriate response if necessary at block 525.

In some embodiments, the data output from the sensor 112 may comprise coordinate information associated with its sensed information. For example, if the sensor 112 comprises a 3D scanner (e.g., LiDAR), it may output data for each scanned point along with a distance and angle with reference to an axis of the sensor 112. The sensor 112 location on the MHV 110 may be accounted for to determine a sensor 112 measurement with respect to the MHV 110. For example, if the sensor 112 is 0.5 m to the right of the center of the truck (where the center of the MHV 110 is x=0), then the value 0.5 m may be subtracted from all sensor 112 measurements along that axis to determine the relative position of a sensed obstacle with respect to the MHV 110. The sensor 112 may also, for example, report 90 degrees as due north from the sensor, such that for a point (e.g., point 420 shown in FIG. 4) reported as 1 m, 90 degrees, the reported x-coordinate $x_r$ of the point 420 is 1 m*cos (90 degrees)=0 m, and the reported y-coordinate $y_r$ of the point 420 is 1 m*sin (90 degrees)=1 m (assuming zero offset of the sensor with respect to the center of the MHV 110).

Thus, if the MHV 110 is at an angle θ with respect to the wire 305, the angle may be applied as a direct offset to the reported angle value from the sensor 112 for the coverage field transform. For example, if the MHV 110 is at an angle of 1 degree (in the positive x direction) with respect to the wire 305, then the reported position of the point 420 described in the previous paragraph would be transformed as 1 m, (90 degrees−1 degree). Therefore, the new operational value of the point 420 with respect to the wire will be: transformed x-coordinate $x_t$=1 m*cos (89 degrees)=0.017 m, and transformed y-coordinate $y_t$=1 m*sin (89 degrees) =0.999 m. Thus, the reported coordinate ($x_r$, $y_r$) in the reference frame of the MHV 110 is transformed into a transformed coordinate ($x_t$, $y_t$) in the reference frame of the wire 305.

As another example, if the MHV 110 is offset some distance from the wire 305 (e.g., reported in the direction of the x-axis), the distance may be applied as a direct offset to the reported distance (e.g., radius) from the sensor 112 for the coverage field transform. If the MHV 110 is offset from the wire 305 by 0.1 m, then the point described above (reported as 1 m, 90 degrees) would be transformed as x=0 m+0.1 m=0.1 m, y=1 m.

In some examples, an rPort interface (from The Raymond Corporation) of the MHV 110 can communicate distance from wire, as well as steering angle. The distance and steering angle can be used to determine the offset and heading angle of the preferred wire guided path from the current location of the MVH 110. The field as defined for the preferred follow case (e.g., straight in front of the MHV 110 and aligned with its forward direction) is then coordinate transformed as described above to account for the actual truck position based on distance from the wire 305 and a heading angle.

Figure 6:
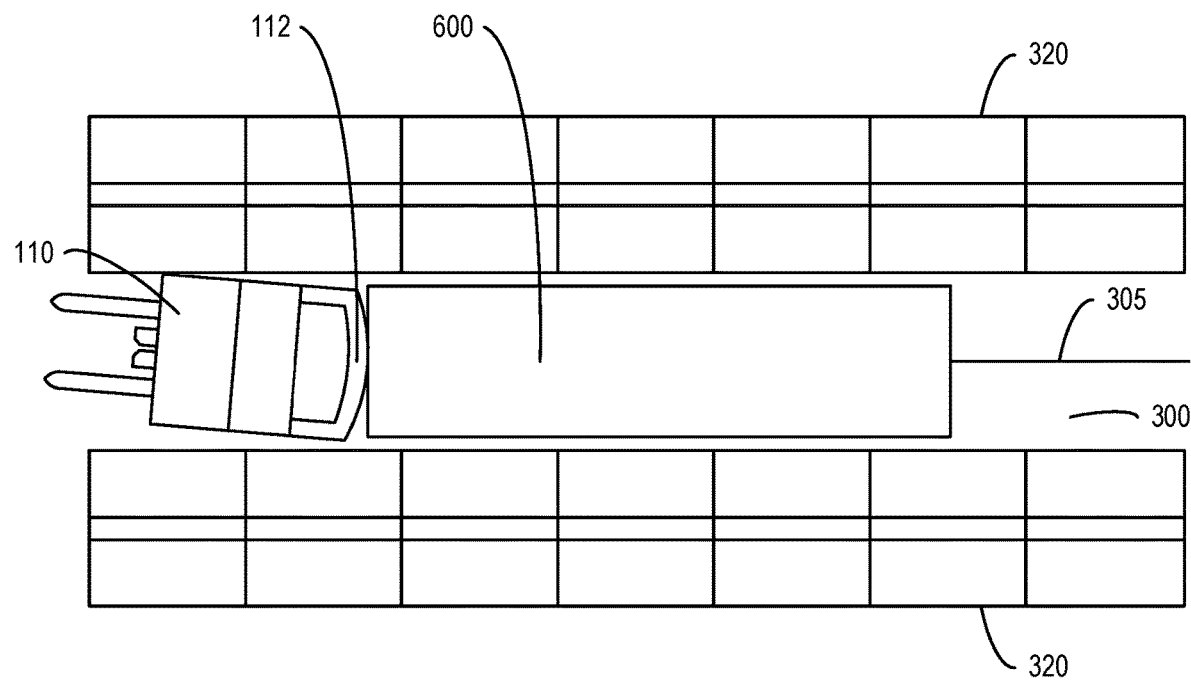
FIG. 6 is a diagram of an example MHV navigating an aisle with an actual heading and a transformed sensor coverage field, according to some aspects of the present disclosure.

FIG. 6 is a diagram of an example MHV 110 navigating a VNA 300 that is not centered on the wire 305 and has a non-zero steering angle, but with a transformed sensor coverage field 600, according to some aspects of the present disclosure. The diagram illustrates the MHV 110 navigating the VNA 300 guided by the wire 305. In this example, the MHV 110 is traveling at a non-zero horizontal distance from the wire 305 and a non-zero heading angle relative to the wire 305. Based on the process 500, the controller 118 can generate a transformed sensor coverage field 600 for the sensor 112. Accordingly, although the MHV 110 has a current heading, a preferred coverage field is provided via the sensor 112, thus able to detect obstacles within the VNA 300 and the path of the MHV 110 while not considering extraneous obstacles. In some embodiments, the transformed sensor coverage field 600 can track against the projected motion of the MHV 110 because the ultimate travel path of the MHV 110 may be assumed to follow the modeled guidance of the wire 305 or other travel guidance system. Example advantages to the implementation of one or more of the techniques disclosed herein include full MHV path coverage during guidance in a VNA, and a reference for in aisle functionality and obstacle classification, including overhanging pallets extending beyond or into an aisle.

The disclosed technology presents systems and methods to achieve obstacle detection coverage with consideration to the tolerances of a wire guidance system. However, one of ordinary skill in the art would understand that the disclosed approach can be further generalized to consider tolerances for alternative guidance mechanisms including rail guidance, infrastructure free wire guidance, Automated Guided Vehicles (AGV), in-vehicle guidance, other facility-based guidance, and others.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the disclosed technology described herein.

Thus, while the disclosed technology has been described in connection with particular embodiments and examples, the disclosed technology is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the disclosed technology are set forth in the following claims.

We claim:

1. A system for generating a coverage field for obstacle detection comprising:
   a sensor;
   a material handling vehicle guided by a guidance system; and
   a controller configured to:
      generate a coverage field;
      receive position characteristics of the material handling vehicle;
      determine a position of the material handling vehicle relative to the guidance system based on the position characteristics; and
      transform the coverage field based on the determined position of the material handling vehicle.

2. The system of claim 1, wherein the controller determines a position of the material handling vehicle based on a parameter, wherein the parameter is at least one of: a speed of the material handling vehicle, a distance of the material handling vehicle relative to the guidance system, or a steering angle of the material handling vehicle.

3. The system of claim 2, wherein the controller further configured to:
   determine the parameter of the material handling vehicle exceeds a predetermined threshold; and
   in response to determining the parameter exceeds the predetermined threshold, transform the coverage field based on the parameter.

4. The system of claim 2, further comprising a second sensor configured to detect a distance of the material handling vehicle relative to a fixture within an aisle of the material handling vehicle.

5. The system of claim 4, wherein the controller is further configured to:
   receive a signal representing the distance of the material handling vehicle relative to the fixture within the aisle; and
   determine the distance of the material handling vehicle relative to the guidance system based on the signal.

6. The system of claim 2, wherein the controller is further configured to:

determine, using the sensor, the distance of the material handling vehicle relative to a fixture within the aisle; and determine the distance of the material handling vehicle relative to the guidance system based on the determined distance of the material handling vehicle relative to the fixture within the aisle.

7. The system of claim 1, wherein the transformed coverage field of the sensor only covers a region of space based on a path of the material handling vehicle.

8. The system of claim 1, wherein the sensor is at least one of the group comprising: an image sensor, a LiDAR sensor, and a RADAR sensor.

9. A method for generating a coverage field for obstacle detection, comprising:
   generating, via a controller, a coverage field for a sensor output;
   receiving, via the controller, position characteristics of a material handling vehicle guided by a guidance system;
   determining, via the controller, a position of the material handling vehicle relative to the guidance system; and
   transforming the coverage field based on the determined position of the material handling vehicle.

10. The method of claim 9, further comprising:
    determining, via the controller, a position of the material handling vehicle based on a parameter, wherein the parameter is at least one of: a speed of the material handling vehicle, a distance of the material handling vehicle relative to the guidance system, or a steering angle of the material handling vehicle.

11. The method of claim 10, further comprising:
    determining, via the controller, the parameter of the material handling vehicle exceeds a predetermined threshold; and
    in response to determining the parameter exceeds the predetermined threshold, transforming, via the controller, the coverage field based on the parameter.

12. The method of claim 10, further comprising:
    receiving, via the controller, a signal representing the distance of the material handling vehicle relative to a fixture within the aisle; and
    determining, via the controller, the distance of the material handling vehicle relative to the guidance system based on the signal.

13. The method of claim 12, further comprising:
    detecting, via a second sensor, a distance of the material handling vehicle relative to the fixture within an aisle of the material handling vehicle.

14. The method of claim 12, further comprising:
    detecting, via the sensor, a distance of the material handling vehicle relative to the fixture within an aisle of the material handling vehicle.

15. The method of claim 9, wherein the transformed coverage field of the sensor only covers a region of space based on a path of the material handling vehicle.

16. The method of claim 9, wherein the sensor is at least one of the group comprising: an image sensor, a LiDAR sensor, and a RADAR sensor.

17. The system of claim 1, wherein the guidance system is at least one of a wire guidance system and a rail guidance system.

18. The method of claim 9, wherein the guidance system is at least one of a wire guidance system and a rail guidance system.

19. A method for generating a coverage field for obstacle detection, comprising:
    generating, via a controller, a coverage field for a sensor;
    receiving, via the controller, position characteristics of a material handling vehicle operating in an aisle and guided by a guidance system;
    determining, via the controller, a position of the material handling vehicle relative to the aisle; and
    transforming the coverage field based on the determined position of the material handling vehicle.

20. The method of claim 19, further comprising: applying the coverage field to a sensor output.

* * * * *